Nov. 3, 1953 — C. S. MORRISON — 2,657,949
TOWED SPRAYER
Filed Aug. 15, 1949 — 2 Sheets-Sheet 2
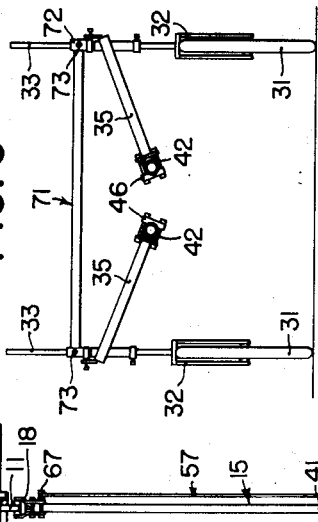
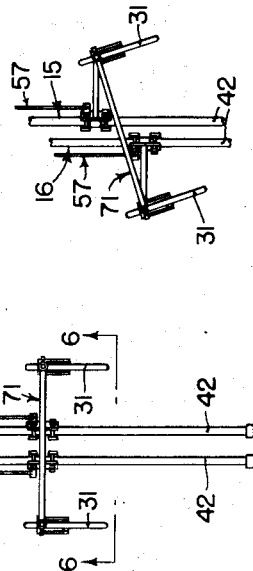
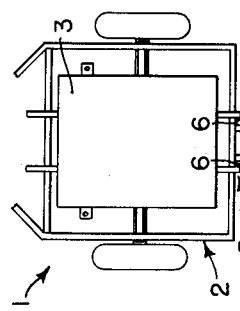
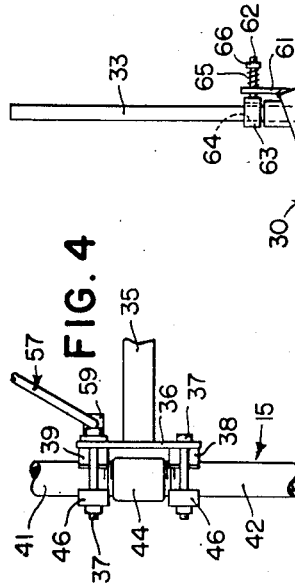
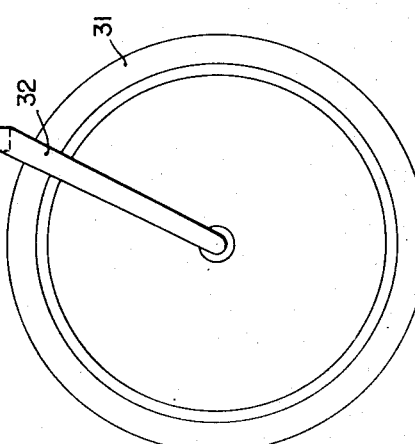
INVENTOR.
CHARLES S. MORRISON
ATTORNEYS Patented Nov. 3, 1953

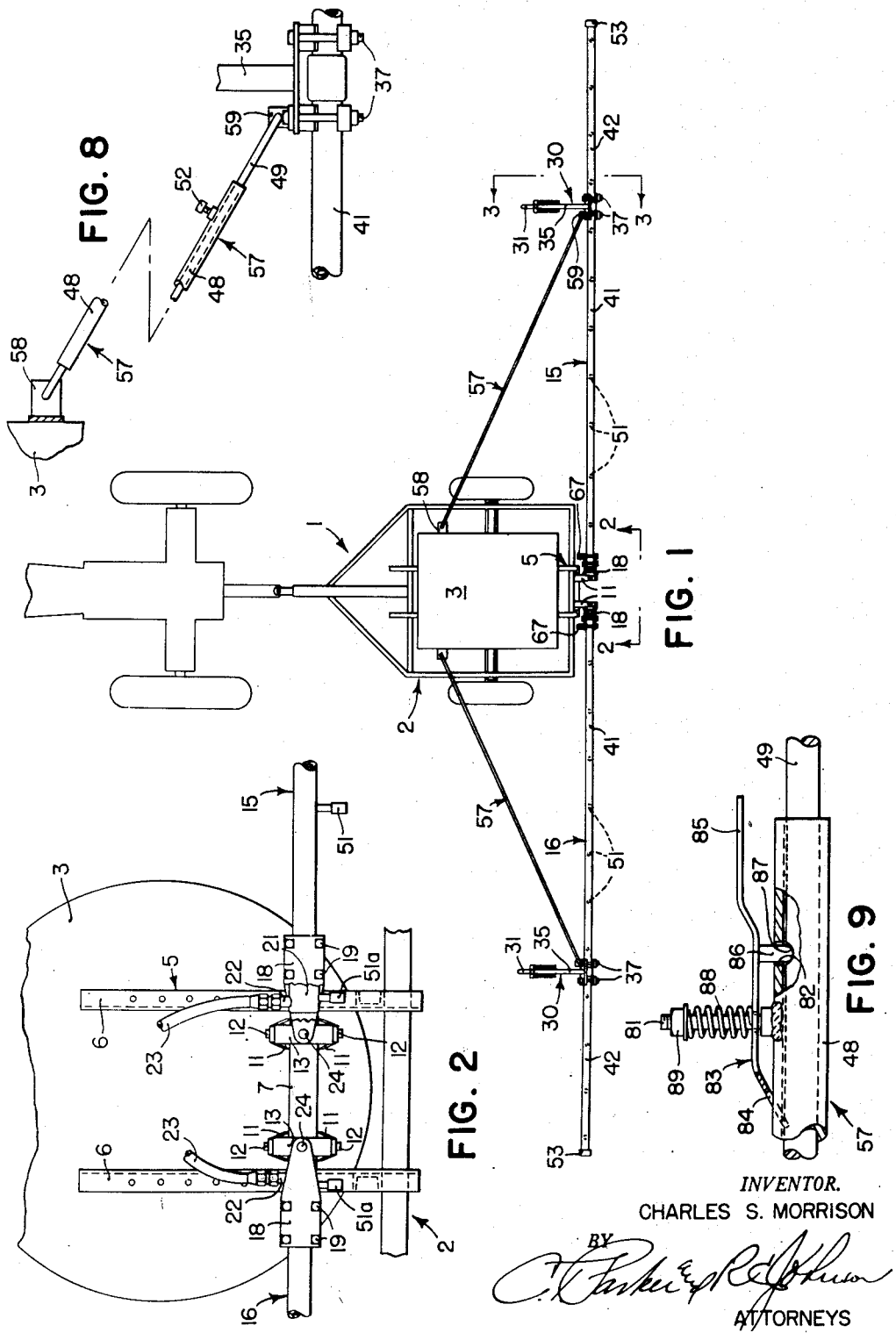

2,657,949

UNITED STATES PATENT OFFICE 2,657,949

TOWED SPRAYER

Charles S. Morrison, Moline, Ill., assignor to Deere & Company, Moline, Ill., a corporation of Illinois Application August 15, 1949, Serial No. 110,273

13 Claims. (Cl. 299—39)

The present invention relates generally to agricultural machines and more particularly to sprayers and the like for distributing chemical weed destroyers and other spray materials.

The object and general nature of the present invention is the provision of a sprayer boom structure which when extended can cover a relatively wide strip of land but which may be folded rearwardly into compact relation for transport along roads, highways, lanes, through gates and other restricted areas. More particularly, it is a feature of this invention to provide a new and improved caster wheel boom support which may readily be shifted from widespread or laterally outwardly extending positions to a rearwardly extending transport position. A further feature of this invention is the provision of means for easily and conveniently holding the booms in their folded or transport position.

Another feature of this invention is the provision of means connected with the spindles of the caster wheels supporting the booms for not only holding the booms in their rearwardly folded transport position but also locking the wheels against castering, but without interfering with the shifting of one boom relative to the other as may occur when the outfit is moved around corners or the like.

A further feature of this invention is the provision of a sprayer boom structure in which the sprayer booms or pipes are self-supporting and do not require a separate framework.

Still further, another feature of this invention is the provision of a sprayer boom structure which includes releasable braces whereby the boom may swing rearwardly if it should inadvertently strike an obstruction or the like, the outer portion of each boom pipe being supported on a caster wheel so as to readily accommodate rearward swinging of each boom.

These and other objects and advantages of the present invention will be apparent to those skilled in the art after a consideration of the following detailed description, taken in conjunction with the accompanying drawings, in which:

Figure 1 is a plan view of a sprayer in which the principles of the present invention have been incorporated, the spray booms being shown in their operative extended position;

Figure 2 is a fragmentary elevational view, showing the connections between the inner ends of the booms and the supporting framework;

Figure 3 is a view taken generally along the line 3—3 of Figure 1, showing the caster wheel supporting bracket and associated parts;

Figure 4 is a view taken generally along the line 4—4 of Figure 3 showing the caster wheel bracket connection with the associated boom;

Figure 5 is a plan view showing the booms folded into their transport position and locked in transport position by means interconnecting the upper ends of the caster wheel spindles;

Figure 6 is a sectional view taken generally along the line 6—6 of Figure 5;

Figure 7 is a fragmentary plan view of the boom pipes and their transport interconnection in a turning position;

Figure 8 is an enlarged detail view of the draft rod adjusting structure; and

Figure 9 is a view similar to Figure 8 but showing a modified form.

Referring now to the drawings, particularly Figures 1 and 2, the sprayer in which the principles of the present invention have been incorporated includes a wheel-supported trailer 1, the frame 2 of which supports a tank 3 from which the spray material is delivered under pressure to the sprayer boom pipes. Connected to the rear portion of the frame 2 is a boom-supporting frame 5 which includes a pair of uprights 6 fixed to the frame 2 in any suitable way and provided with a number of apertures by means of which a transverse boom-supporting channel 7 may be connected thereto at different elevations relative to the ground. Fixed to the channel 7 are two pair of rearwardly extending arms 11, as by welding or the like. The outer ends of the two pairs of arms 11 are apertured to receive pivots 12 by means of which a gimbal ring 13 may be pivotally connected with each pair of supporting arms 11 for movement relative thereto about a vertical axis. Right- and left-hand booms or boom pipes 15 and 16 are connected at their inner ends to the associated gimbal rings 13 by means of a pair of arms 18 pivotally connected with each gimbal ring 13 and secured to the associated boom by means of two pairs of clamping bolts 19 or other suitable means. The inner end of each of the booms 15 and 16 is closed by a cap 21 to which a fitting 22 is connected. Spray material under pressure is delivered through a hose 23 to each of the fittings 22, the hose lines 23 being flexible to accommodate either vertical or fore and aft swinging of the associated boom relative to the frame 2, as permitted by the universal joint of the gimbal rings just described. Each of the pairs of boom arms 18 is pivotally connected by pivots 24 to the associated gimbal ring 13 for movement relative thereto about a horizontal axis.

The laterally outer portion of each of the booms is supported on a ground wheel structure indicated in its entirety by the reference numeral 30. The structure 30 includes a castering ground wheel 31 connected for rotation in the lower end of a wheel fork 32 the upper portion of which extends upwardly and forms a spindle 33 which is disposed in a vertical sleeve 34 fixed to the forward and upwardly disposed end of a bracket 35, the lower or rear end of which is fixed to the associated boom. As best shown in Figure 3, the rear end of each of the brackets 35 carries a transverse attaching plate section 36 which is apertured to receive two pairs of bolts 37. Secured, as by welding, are two V-shaped socket members 38 and 39 which fit against the associated boom. Preferably, each of the booms 15 and 16 is formed of an inner section 41 and an outer section 42 secured together by a coupling 44. The plate 36 spans the coupling 44, and a clamp member 46, provided with a serrated socket section 47, is carried by each pair of bolts so that there is a clamping cap 46 at opposite sides of the coupling 44. When the bolts 37 are tightened, the two boom pipe sections 41 and 42 are rigidly fixed to the caster wheel bracket 35 without overloading or over-stressing the coupling 44. Each of the booms 15 and 16 carries a plurality of spray nozzles 51 arranged at uniform spacing and constructed to provide the desired spray pattern. The gimbal type joints by which the inner end of each boom is connected to the supporting frame 2 are spaced close enough so that the innermost nozzles 51a at the inner ends of the booms are spaced apart substantially the same distance as the spacing between the nozzles 51 laterally outwardly thereof. The outer ends of the boom pipe sections 42 are closed by a cap 53. A set screw collar 54 is fixed to each caster wheel spindle section 33 so as to carry the associated boom at the desired height above the ground. As best shown in Figure 3, the wheels 31 are arranged to contact the ground at a point rearwardly of the spindle axis but each bracket 35 is of sufficient length to dispose the ground wheels 31 forward of the vertical transverse plane, indicated by the broken line P in Figure 3, of the extended booms whereby the wheels 31 being forward of the plane P clear the sprayed material which is distributed preferably in a fan pattern substantially in the plane P (Figure 3). Consequently, the ground wheels, being forward of the spray booms, do not run over the sprayed ground and do not pick up sprayed material therefrom.

A pair of draft rods 57 are connected between the outer portions of the booms and the tank frame 2. Each draft rod is indicated in its entirety by the reference numeral 57 and, as best shown in Figure 8, comprises telescopic sections 48 and 49, the forward section 48 being connected to a bracket 58 carried by the tank 3. The rear portion of the forward section 48 carries a set screw 52 which, when tightened, secures the forward end portion of the rod section 49 in place. The rear end of the rod section 49 is connected directly to the associated bracket structure 35, preferably by means of an angle lug 59 fixed to the bracket plate 36 by one or more of the clamping bolts 37. Preferably, the set screws 52 are tightened sufficiently to hold the rod sections 48 and 49 against displacement under normal operating conditions, but if either or both of the booms should strike an obstruction the rod section or sections 49 will slip away from the outer end of the associated pipe section 48 to free the boom or booms for rearward swinging. In this way, a safety release device is provided to protect the booms and associated structure against damage.

To eliminate undesirable oscillation of the caster wheels 31, each caster wheel bracket 35 is provided with an upwardly extending arm 61 which is apertured to receive a threaded stud 62 which at its inner end is connected to a snubbing ring 63. The latter member is lined with friction material 64 and snugly embraces the associated caster wheel spindle section 33. A spring 65 is disposed about the stud 62 on the outer side of the bracket 61, and an adjusting nut 66 on the threaded stud 62 serves as an adjustable abutment against which the spring 65 bears for pressing one side of the snubbing ring 63 against the associated caster wheel spindle 33, thereby imposing a limited amount of friction on the caster wheel spindle and thus restricting its oscillation about a generally vertical axis.

Figure 5 shows the booms 15 and 16 folded rearwardly into a position for transport, and to bring the booms to this position all that it is necessary to do is to remove the forward and inner ends of the draft or brace rods 57 from their connection 50 with the tank 3 and swing the booms laterally and rearwardly, this being easily accomplished by virtue of the castering of the supporting wheels 31. By loosening the set screws 57 to permit the draft rod sections 48 and 49 to retract or extend, as necessary, the inner ends of the rods 57 may be supported by means of apertured brackets 67 fixed to the forward gimbal joint arms 18. In their transport position, as will be clear from Figure 5, the booms 15 and 16 are brought quite close together. Since in this position the ground wheel 31 contacts the ground at points which are spaced a considerable distance from the boom pipes, it is desirable to eliminate the torsional strains which would otherwise be imposed on the boom pipes by interconnecting the caster wheel spindle sections 33. For this purpose, I provide a transverse channel member 71 which is provided with sleeves 72 at opposite ends and which may be readily placed over the caster wheel spindles 33 for not only holding the boom pipes in their folded positions but also relieving them of any torsional strains due to the fact that the caster wheels in their transport position are a considerable distance offset from the vertical planes of the boom pipes. Also, in order to prevent the booms from shifting laterally, especially when the outfit is drawn over side slopes, crowned roads or lanes, or the like, it is desirable to lock the wheels 31 against castering in the transport position of the booms. To this end, I provide each of the spindle-receiving sleeves 72 with a locking set screw 73 so that merely by tightening the set screws 73 the wheel spindles are rigidly fixed to the interconnecting member 71. However, since each of the brackets 35 may pivot on the wheel spindle associated therewith, turning of the outfit is readily accommodated since either boom may shift in a generally fore and aft direction relative to the other while the caster wheels are locked against castering by the interconnecting transport member 71. Fixedly interconnecting the caster wheel spindles for transport has a further advantage of steering the wheels 31 when the outfit passes around a corner. The steering effect is secured due to the fact that the forward ends of the boom pipes are connected to the trailer frame 2 at points spaced apart from one another whereby, when the trailer frame turns, one boom pipe is shifted relative to the other, this being accommodated by the pivoting of the wheel brackets 35 on the respective wheel spindles. This relative movement between the brackets and the rigid interconnection of the caster wheel spindles 33 causes the wheels 31 to be turned a limited amount so as to carry the rear portions of the booms toward the direction of turn. This facilitates moving the outfit through relatively narrow gates or the like since the rear end portions of the booms are thus prevented from being swung outwardly against the opposite side of the gate as would be the result if the wheels 31 were, for example, steered in the other direction by the turning of the trailer frame relative to the booms.

Although, as shown in Figure 3, the ground wheels 31 are disposed ahead of the vertical plane of the spray booms, which brings the point of contact of each wheel with the ground a relatively short distance ahead of the aforesaid plane, the booms are capable of withstanding the relatively moderate amount of torsion which is imposed on the booms by virtue of carrying the weight of the outer sections thereof at points offset with respect thereto. Moreover, this torsion is offset to a considerable degree by virtue of connecting the draft rods or braces 57 directly to the rear ends of the brackets 35 which, in effect, serve to propel the ground wheels 31 over the surface of the ground without transmitting any of the forces involved through the associated boom section. In other words, the effect of the forward pull transmitted to the brackets 35 by the draft rods 57, and the resistance of the soil to forward travel of the associated wheel 31, serve to tend to rock the brackets 35 and associated parts in a clockwise direction, as viewed in Figure 3, which to a considerable extent overcomes the torsion imposed on the booms and its gimbal connection with the trailer frame 2 by the disposition of the boom parts rearward of the point of contact with the ground wheel and the surface of the ground. It is to be noted that, according to the principles of the present invention, the booms 15 and 16 are self-supporting; that is, they do not require any separate supporting frame, and hence the sprayer of the present invention is lighter in weight and more easily maneuvered than those having or requiring separate framework structure for carrying the spray pipes.

A modified form of brace rod structure is shown in Figure 9. In this form of the invention the pipe section 48 of each brace rod structure 57 is provided with a threaded stud 81 fixed thereto, as by welding or the like, adjacent an aperture 82 formed in the pipe section 48 adjacent the stud. A strap member 83 is carried by the pipe section 48, having an aperture to receive the stud 81 and at one end a bifurcated section 84 to fulcrum against the pipe section 48 and a handle section 84 at the other end. Each strap member 83 has a short inwardly extending lug 86 fixed thereto in a position to pass through the opening 82 into engagement with a recess 87 formed in the associated rod section 49. A spring 88 is disposed about the outer portion of the stud 81 and bears at one end against the spring member 83 and at the other end against an adjusting nut 89 on the stud 81. The recesses 87 in the rod section 49 are sufficiently deep and the spring 88 is tightened the requisite amount by proper adjustment of the nut 89 so as to hold the rod section 49 in position relative to the pipe section 48 of the brace rod structure 57 so as to hold the booms in normal operating position against ordinary draft loads. However, if the associated boom should encounter an obstruction or the like, the spring 88 will yield to permit the rod section 49 of Figure 9 to be withdrawn from the pipe section 48 so as to free the boom for rearward swinging and thus pass around the obstruction, such rearward swinging being readily accommodated by virtue of the caster wheel support 30.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a sprayer or the like, a frame adapted to be advanced across a field, a folding boom structure comprising a pair of boom pipes having spray nozzles and adapted to extend laterally outwardly from said frame transversely of the line of advance of said frame, means for connecting the inner ends of said boom pipes to said frame so as to be torsionally rigid therewith but capable of both vertical and horizontal movement relative to the frame, a ground wheel forming the sole support of the associated portion of said boom pipe, and means forming the sole connection between said boom pipe portion of each pipe and the associated ground wheel, said connecting means being connected to each boom pipe in such a position that the wheel contacts the ground at a point spaced in a fore and aft direction from and in advance of the vertical plane of the associated boom pipe.

2. In a sprayer or the like, a frame, a folding boom structure comprising a pair of boom pipes having spray nozzles and adapted to extend laterally outwardly from said frame, means for connecting the inner ends of said boom pipes to said frame so as to be torsionally rigid therewith, a bracket fixed at its rear end to each boom pipe between the ends of the latter and extending generally forwardly therefrom when the boom pipes are extended, a ground wheel supportingly connected to the forward end of each bracket, the latter being long enough to position the associated wheel so that it contacts the ground at a point forward of the vertical plane of said boom pipes when extended, and brace means connectible with each boom pipe substantially at the point of the associated bracket and adapted to extend generally forwardly and inwardly to said frame.

3. A sprayer comprising a frame, a pair of booms connected with said frame for swinging between laterally outwardly extended and trailing rearwardly disposed positions, a bracket fixed to each boom, a caster wheel spindle connected at the upper end portion thereof with each bracket, each spindle extending generally vertically above the associated bracket, a caster wheel connected with the lower end of each spindle, means connectible with the upper ends of said caster wheel spindles above said brackets for holding said booms substantially alongside one another in trailing relation, and means for holding said wheels against castering in the trailing position of said booms.

4. In a sprayer or the like, a frame, a folding boom structure comprising a pair of boom pipes having spray nozzles and adapted to extend laterally outwardly from said frame, means for connecting the inner ends of said boom pipes to said frame for both vertical and horizontal movement relative to the frame, a caster wheel connected with each boom pipe for supporting the outer portion thereof, said boom pipes being swingable into positions alongside one another rearwardly of said frame in trailing relation with respect thereto for transport purposes, and means for holding said wheels against castering in the transport position of said boom pipes.

5. A sprayer comprising a frame, a pair of booms connected with said frame for swinging between laterally outwardly extended and trailing rearwardly disposed positions but held against rotation relative to said frame, a castering ground wheel connected to each boom and supporting the latter in both its laterally extended position and in its rearwardly trailing position, means for holding said wheels against castering when in the rearwardly trailing position of the booms, and means for connecting said booms together when in their trailing position.

6. In a sprayer or the like, a frame, a folding boom structure comprising a pair of boom pipes having spray nozzles and adapted to extend laterally outwardly from said frame, means for connecting the inner ends of said boom pipes to said frame for swinging movement in a horizontal plane, a caster wheel connected with each boom pipe for supporting the outer portion thereof, said boom pipes being swingable into positions alongside one another rearwardly of said frame in trailing relation with respect thereto for transport purposes, each of said caster wheels including a vertically extending spindle, and means adapted to be fixed to said spindles for holding said wheels against castering when said boom pipes are swung into their trailing position.

7. In a sprayer or the like, a frame, a folding boom structure comprising a pair of boom pipes having spray nozzles and adapted to extend laterally outwardly from said frame, means for connecting the inner ends of said boom pipes to said frame for swinging movement in a horizontal plane, a caster wheel connected with each boom pipe for supporting the outer portion thereof, said boom pipes being swingable into positions alongside one another rearwardly of said frame in trailing relation with respect thereto for transport purposes, each of said caster wheels including a vertically extending spindle, and a transport link including an elongated part having sleeves at its ends adapted to be passed over the ends of caster wheel spindles for locking the boom pipes against movement out of their trailing position.

8. In a sprayer or the like, a frame, a folding boom structure comprising a pair of boom pipes having spray nozzles and adapted to extend laterally outwardly from said frame, means for connecting the inner ends of said boom pipes to said frame for swinging movement in a horizontal plane, a caster wheel connected with each boom pipe for supporting the outer portion thereof, said boom pipes being swingable into positions alongside one another rearwardly of said frame in trailing relation with respect thereto for transport purposes, each of said caster wheels including a vertically extending spindle, means for interconnecting said spindles when said boom pipes are swung into their trailing position, and means carried by said interconnecting means for holding said wheels against castering.

9. A sprayer comprising a frame, a pair of booms connected with said frame for swinging between laterally outwardly extended and trailing rearwardly disposed positions but held against rotation relative to said frame, a bracket fixed to each boom, a caster wheel spindle journaled at the upper end in each bracket, a caster wheel connected for rotation with the lower end of each spindle, said brackets being long enough to dispose said wheels forward of the vertical plane of said booms when extended, and means for interconnecting said brackets when the booms are in their trailing position so as to relieve said booms of torsional strains during transport.

10. In a sprayer or the like, a frame, a folding boom structure comprising a pair of boom pipes having spray nozzles and adapted to extend laterally outwardly from said frame, means for connecting the inner ends of said boom pipes to said frame for swinging movement relative thereto in a generally horizontal direction, a caster wheel supporting structure connected with the outer end portion of each of said boom pipes, a brace rod structure connecting the outer end portion of each of said boom pipes with said frame, each of said brace rod structures including separable sections, and spring means yieldingly connecting said sections, one section being releasable from the other to accommodate the rearward swinging of the associated boom pipe, as when the latter encounters an obstruction or the like during operation.

11. The invention set forth in claim 10, further characterized by each of said brace rod structures including separable sections, and friction means for yieldingly holding said sections in connected relation.

12. A sprayer comprising a frame, a pair of booms connected with said frame for swinging between laterally outwardly extended and trailing rearwardly disposed positions but held against rotation relative to said frame, a bracket fixed to each boom, a caster wheel spindle journaled at the upper end in each bracket, a caster wheel connected for rotation with the lower end of each spindle, said brackets being long enough to dispose said wheels forward of the vertical plane of said booms when extended, and a transport link adapted to be operatively connected with said boom pipes for holding the outer portions of the latter against torsional displacement during transport.

13. A sprayer comprising a frame, a pair of booms connected with said frame for swinging between laterally outwardly extended and trailing rearwardly disposed positions, a bracket fixed to each boom, a caster wheel spindle connected at the upper end portion thereof with each bracket, each spindle extending generally vertically above the associated bracket, a caster wheel connected with the lower end of each spindle, and means connectible with the upper ends of said caster wheel spindles above said brackets for holding said booms substantially alongside one another in trailing relation, said means comprising a cross member having vertical sleeve extensions fixed to said member at the ends thereof, said sleeve extensions being of such length as to hold said spindle generally in a vertical position.

CHARLES S. MORRISON.

(References on following page)

References Cited in the file of this patent

UNITED STATES PATENTS

| Number | Name | Date |
|---|---|---|
| 738,271 | Astle | Sept. 8, 1903 |
| 912,966 | Lamiell et al. | Feb. 16, 1909 |
| 1,470,246 | Willis et al. | Oct. 9, 1923 |
| 1,633,294 | Stubenberg | June 21, 1927 |
| 1,634,701 | Williams | July 5, 1927 |
| 1,943,655 | Cummings | Jan. 16, 1934 |
| 2,370,355 | Jones | Feb. 27, 1945 |
| 2,548,209 | Foster | Apr. 10, 1951 |
| 2,575,521 | Ireland | Nov. 20, 1951 |

FOREIGN PATENTS

| Number | Country | Date |
|---|---|---|
| 17,308 | France | May 23, 1913 |
| 37,954 | Denmark | Sept. 7, 1927 |
| 49,631 | Netherlands | Oct. 16, 1940 |